R. GALLOWAY.
COUPLING FOR SUCTION DEVICES.
APPLICATION FILED MAR. 18, 1916.
1,202,506.  Patented Oct. 24, 1916.
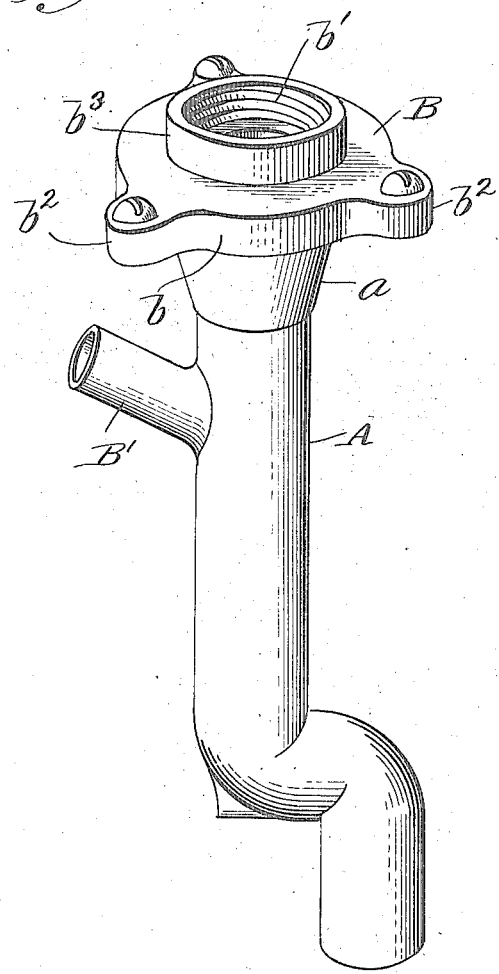
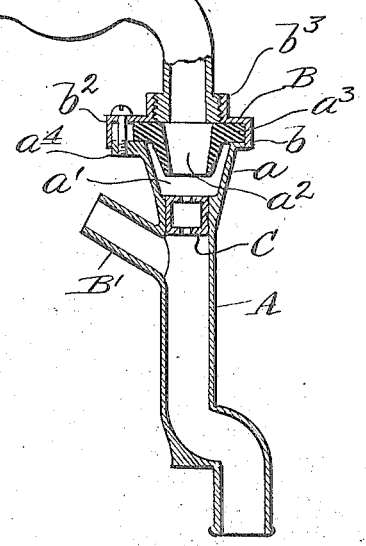
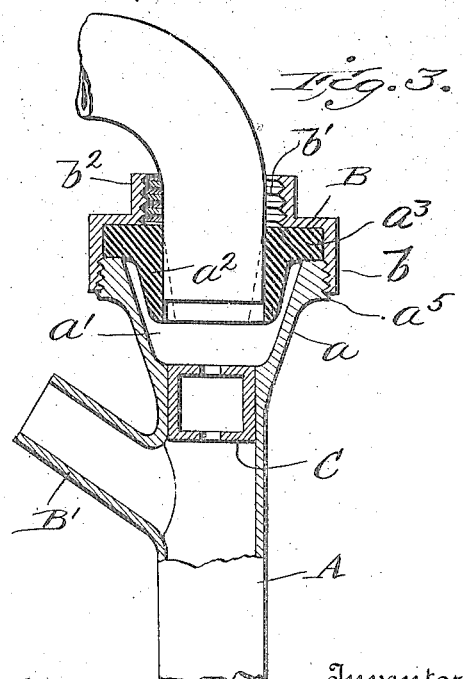
Inventor
Robert Galloway
By Church & Church
Attorney

UNITED STATES PATENT OFFICE.

ROBERT GALLOWAY, OF BUFFALO, NEW YORK.

COUPLING FOR SUCTION DEVICES.

1,202,506.  Specification of Letters Patent.  Patented Oct. 24, 1916.

Application filed March 18, 1916. Serial No. 85,156.

*To all whom it may concern:*

Be it known that I, ROBERT GALLOWAY, a citizen of the United States, residing at Buffalo, in the county of Erie and State of New York, have invented certain new and useful Improvements in Couplings for Suction Devices; and I do hereby declare the following to be a full, clear, and exact description of the same, reference being had to the accompanying drawings, forming part of this specification.

This invention relates to improvements in suction apparatus of the type illustrated in my prior Patent No. 1,113,426, dated October 13, 1914, designed for use in connection with a low pressure water system such as the ordinary city water system.

The object of the present invention is to provide a coupling whereby a device of this character may be readily attached to a spigot or faucet having either a smooth exterior or screw-threaded exterior at the end, without changing or interchanging any of the parts of the device.

To these ends the invention consists in certain novel details of construction and combinations and arrangement of parts all as will be now described and the particular features of novelty pointed out in the appended claims.

In the accompanying drawings, wherein is illustrated the preferred embodiment of the invention, Figure 1 is a perspective view of an apparatus embodying the present invention. Fig. 2 is a longitudinal sectional view. Fig. 3 is a view showing a modified arrangement of securing the cap in place.

Similar letters of reference in the several figures indicate the same parts.

Referring to the drawings, the letter A indicates a pipe fitting, B the branch pipe through which the suction is to be created, C the cylindrical casing or nozzle, all as shown and described in my prior patent above referred to. At its upper end the fitting A flares outwardly as at $a$, whereby a recess or chamber $a'$ is formed in the upper end. Fitting loosely in this chamber $a'$ is a gasket $a^2$ of rubber or other suitable material of truncated cone-shape, having a central bore or opening, and provided at its upper end with an annular flange or extension $a^3$ which rests upon the top of the wall of the chamber $a'$, as will be readily understood from the drawings. In order to hold the gasket in place a cap B is employed having a downwardly extending flange $b$ which flange fits over the upper flared end of the fitting, the cap being held tightly down upon the flange $a^3$ of the gasket by means of screws passing through openings in extensions $b^2$ on the cap B and taking in openings in extensions or lugs $a^4$, on the fitting, as shown in Figs. 1 and 2.

If desired, the cap may be secured in place by screwing directly upon the upper end of the fitting, as shown in Fig. 3, screw threads being formed on the inner side of the flange $b$ and the exterior of the fitting as at $a^5$, for this purpose, all as shown clearly in Fig. 3. The top of the cap piece B is formed with an annular opening $b'$ through which the end of the faucet or spigot may pass, the faucet fitting tightly within the gasket, whereby the device will be held firmly upon the faucet.

In order that the device may be readily attached to a spigot or faucet having an exterior screw thread at its end, an upstanding annular wall or flange $b^2$ is formed about the opening $b'$ in the cap B, this flange $b^2$ being provided with screw threads on its inner wall, whereby the device may be screwed upon the end of the faucet, as will be readily understood.

From the above description, the construction of the device will be readily understood, and it will be seen that the device may be secured to a faucet having either a smooth or screw-threaded end, without changing or interchanging any of the parts.

What is claimed is:—

1. In a suction apparatus, the combination with a fitting adapted to be connected to a faucet, a resilient gasket having a central bore, a cap or closure secured to the upper end of the fitting and clamping the gasket in place, said cap having a central opening on its upper side and an annular flange extending upwardly therefrom, said flange being screw-threaded on its inner side.

2. In a suction apparatus, the combination with a fitting adapted to be connected to a faucet and having a chamber at its upper end, a resilient gasket having an annular flange and a truncated cone-shaped center with a central opening therein and fitting within the said chamber, a cap or closure secured to the upper end of the fitting for closing the chamber and holding the gasket in place, said cap having a central opening on its upper side, an annular upstanding flange surrounding said opening and provided with screw threads on its inner side.

3. In a suction apparatus, the combination with a fitting having a suction branch pipe thereon adapted to be connected to a faucet, a resilient gasket having an annular flange with a central opening therein, a cap having a central opening on its upper side and fastened to the upper end of the fitting with machine screws, said screws being adapted to engage the cap and fitting on the outside of the gasket whereby the gasket is secured in position and the location of the suction branch pipe may be moved independently of the gasket to the most suitable position.

4. In a suction apparatus, the combination with a fitting adapted to be connected to a faucet, a resilient gasket having a central bore, a cap or closure secured to the upper end of the fitting and clamping the gasket in place, said cap having a screw threaded central opening on its upper side, whereby said fitting may be attached to a bib having either a smooth or screw threaded outer surface.

ROBERT GALLOWAY.

Witnesses:
CHARLES LEIXNER,
H. H. PERCIVAL.